UNITED STATES PATENT OFFICE.

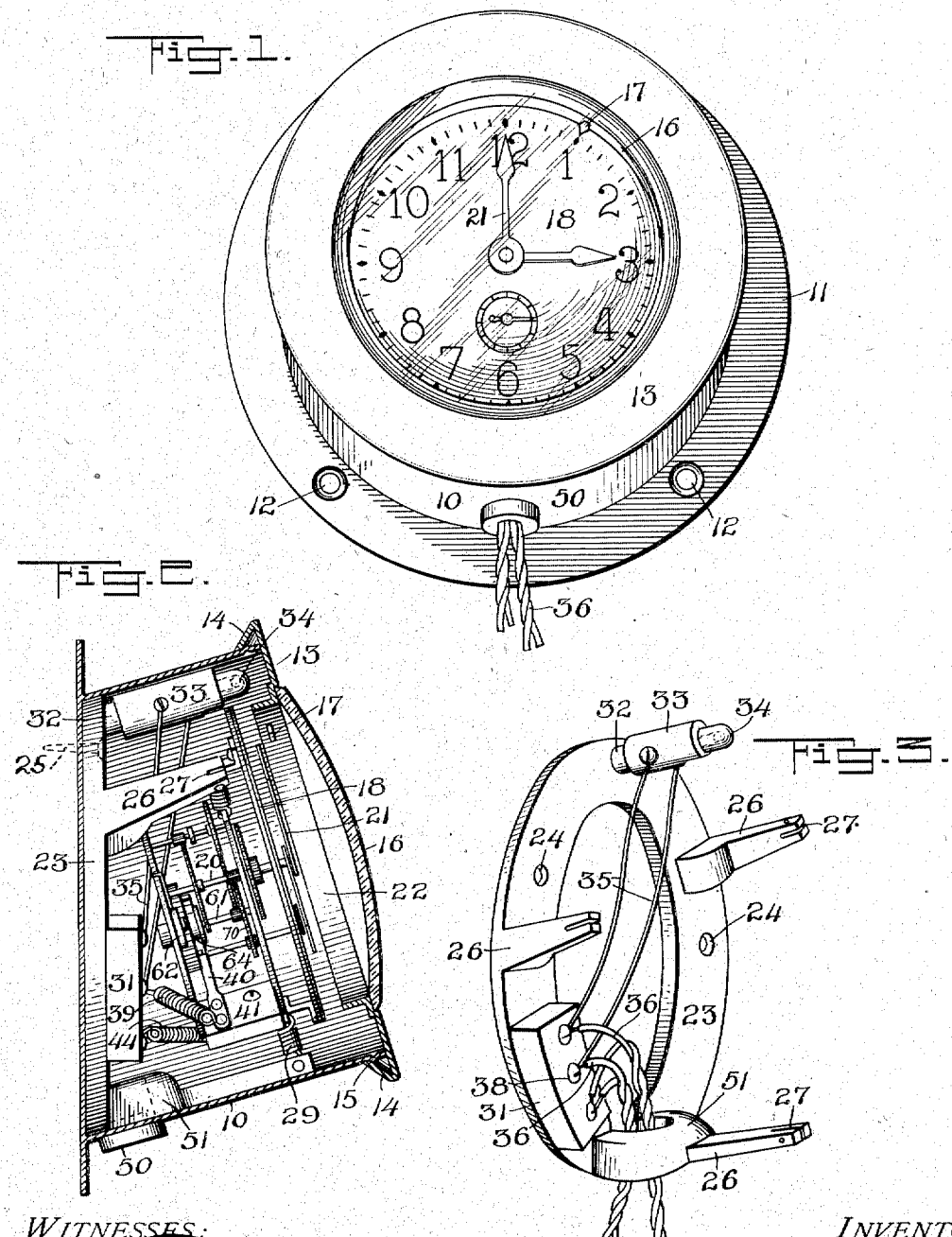

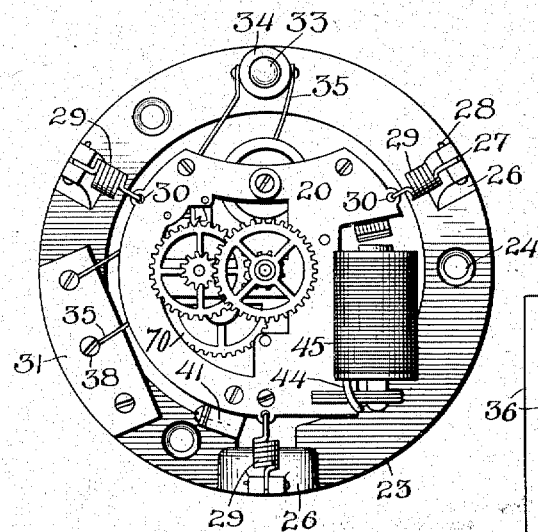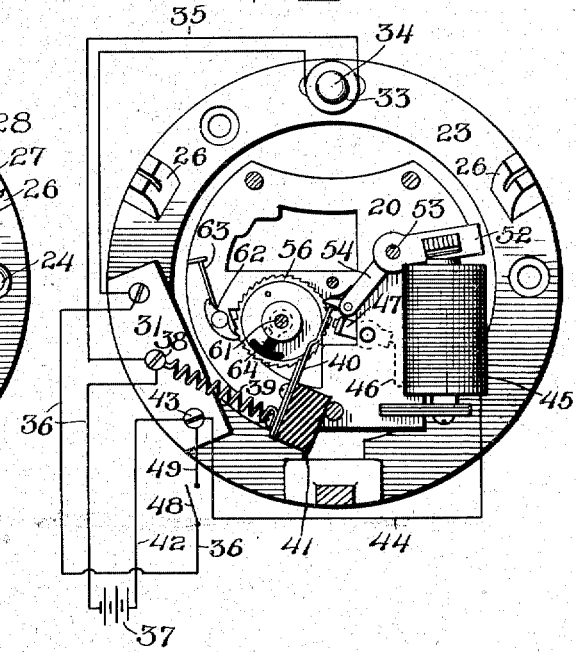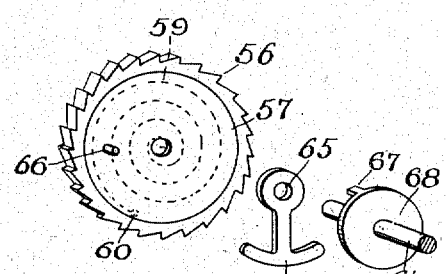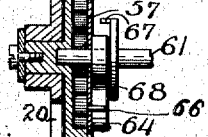

ROBERT L. HIGHT, OF DECATUR, ILLINOIS.

SELF-WINDING ELECTRIC CLOCK.

984,218.  Specification of Letters Patent.  Patented Feb. 14, 1911.

Application filed September 10, 1909.  Serial No. 517,166.

*To all whom it may concern:*

Be it known that I, ROBERT L. HIGHT, a citizen of the United States, residing at Decatur, county of Macon, State of Illinois, have invented certain new and useful Improvements in Self - Winding Electric Clocks, of which the following is a specification, reference being had therein to the accompanying drawing.

This invention relates to a self winding electric clock and particularly to a structure adapted to be intermittently wound for a predetermined period and the rewinding thereof automatically controlled.

The invention has for an object to provide a novel and improved construction of the electrically controlled winding mechanism and the means for automatically actuating the same.

Other and further objects and advantages of the invention will be hereinafter set forth and the novel features thereof defined by the appended claims.

In the drawings—Figure 1 is a perspective of the clock; Fig. 2 is a vertical cross section therethrough; Fig. 3 is a detail perspective of the clock supporting frame and the circuit connections therewith; Fig. 4 is a front elevation of the clock movement upon its frame; Fig. 5 is a vertical section through the clock movement with its frame in elevation and circuit connections in diagram; Fig. 6 is an enlarged vertical section of the winding mechanism shown in Fig. 5; Fig. 7 is a detail perspective of the spring wheel, its shaft and wiper thereon, and Fig. 8 is a detail section thereof.

Like numerals of reference refer to like parts in the several figures of the drawings.

The numeral 10 designates the clock casing which may be of any desired construction or configuration, for instance, in the case of an automobile clock it is disposed at an angle to the flanged back plate 11 which is provided with securing apertures 12 adapted to receive any desired device for securing the casing in position. The casing is provided with a cover 13 having a flange 14 adapted to embrace the open end of the casing and to be secured thereon by means of a lug or projection 15 by which it is frictionally held. This cover is provided with the usual glazed opening 16 and an indicating pointer 17 adapted to coöperate with the dial 18 of the clock. The cover is freely rotatable upon the case so that the pointer 17 may be set to indicate any desired time upon the dial for the purpose of determining the lapsed time upon any trip or for any other purpose.

The clock movement 20 may be of any desired character and is provided with the usual hands 21 coöperating with the dial 18 which is spaced from the wall 22 of the glazed opening 16 as indicated in Fig. 2. This clock movement is supported upon a frame 23 provided with apertures 24 by which it may be secured to the casing or the surface upon which the clock is mounted by means of screws or other fastening devices as shown at 25 and these being concealed prevent theft or removal of the clock by withdrawal of the exposed fastenings from the flanged back 11. This frame is provided with a series of posts 26 bifurcated at their free ends 27 and apertured to receive a supporting pin 28 upon which a coiled spring 29 is pivotally mounted at one end the opposite end thereof being connected to the movement plate at 30 (Fig. 4). By this means the movement is yieldingly suspended so as to diffuse any vibration or sudden jar which would affect the operation or regulation thereof.

The frame 23 has secured thereto an insulated binding block 31 adapted to receive circuit connections as shown in Fig. 3. The frame is also provided with a post 32 upon which the socket 33 of an electric lamp 34 is mounted. This lamp is disposed at one edge of the dial so as to illuminate the same and is fed by the conductor 35 extending therefrom to the binding block and thence by the line wires 36 to any desired source of electric energy such as the battery 37 indicated in Fig. 5. One pole of this battery is connected by a conductor 36 with a post 38 from which circuit is taken for the winding mechanism through a conducting spring 39 leading to a spring contact 40 mounted upon an insulated block 41 carried by the clock movement. The opposite pole of the battery is connected by a line 42 with a binding screw 43 from which a line 44 extends to the winding magnets 45 and from these magnets a line 46 extends to a contact 47 mounted upon and insulated from the frame of the clock movement so as to coöperate with the spring contact 40. One of the conductors 36 is provided with a switch 48, such as a push button which is in circuit with the binding screw 43 through the line 49. When this switch is closed circuit is made through the lamp to illuminate it while the circuit through the magnet is normally open and intermittently closed by the action of the contacts 40 and 47. The conducting wires enter the casing through an insulated bushing 50 disposed in alinement with the yoke 51 of the frame 23 by which the conductors are protected against injury or short circuit.

The magnets 45 coöperate with the armature 52 pivotally mounted upon the frame of the clock movement 53 and provided with a lever arm 54 depending therefrom. This arm has pivoted at its free end a pawl 55 which is held in contact with ratchet teeth 56 of the spring wheel or barrel 57 by means of the spring 58. This wheel is provided with a coiled tension spring 59 as shown by dotted lines in Fig. 7 one end thereof being secured to the wheel at 60 and the opposite end to the shaft 61 of the third wheel 70. The winding wheel is held in adjusted position as fed in one direction by means of the pivoted pawl 62 held in contact with the teeth 56 by means of the spring 63. Loosely mounted upon the shaft 61 is an insulated segmental wiper 64 provided with a pivoting eye 65 to receive the shaft. The shaft 61 is provided with the usual driving gear meshing with the coöperating parts of the clock movement for actuating the same. The spring wheel is provided with a pin 66 which in its travel during the winding action engages and moves the wiper arm off the contact spring 40 in order to break circuit when the winding is completed while this arm is again brought into position by a pin 67 carried by the constantly moving shaft 61 of the third wheel for instance by means of a disk 68 thereon and thus restores contact for a subsequent winding of the lower portion of the spring wheel during the period when the wiper holds the spring contact in engagement with its coöperating contact. The spring wheel 57 has a lateral hub mounted in the clock frame and provided with a bearing socket for the shaft 61.

With the parts in the position shown in Figs. 5 and 6 and the main spring under tension, the pin carried by the shaft of the third wheel will move the wiper into engagement with the spring contact and thus establish circuit through the magnet which continues to intermittently operate its armature so long as circuit is maintained through the spring contact. The lever arm of the armature engages the spring contact and forces it away from the fixed contact and thus breaks circuit while the wiper is in contact therewith to produce the continued vibration by which the ratchet of the spring wheel is fed forward. During this feeding movement the pin upon said wheel engages the wiper and moves it off the contact spring and the winding action then ceases while the clock movement runs under the tension of its main spring until the wiper is again brought into engagement with the contact spring. The winding is thus effected at intervals the duration of which may be varied in accordance with the proportions of the construction.

The invention presents a form of self winding clock electrically actuated and not requiring winding or other attention so that it is especially adapted for use upon automobiles or in other similar places as the movement is suspended to prevent vibration thereof and the dial adapted to be illuminated whenever desired for the purpose of reading the same. The indicating pointer upon the rotatable cover of the case is adapted to be set in alinement with the hands upon the dial at any desired time for the purpose of determining the expired time upon any trip. It will therefore be seen that the invention presents a simple, efficient and economically constructed form of self winding electric clock.

Having described my invention and set forth its merits what I claim and desire to secure by Letters Patent is—

1. In a time mechanism, a clock movement, an actuating spring therefor provided with a winding ratchet, a winding magnet, an armature for said magnet provided with a feed pawl engaging said ratchet, means actuated by said ratchet for controlling a circuit to said magnet, a contact device disposed in said circuit and in the path of travel of said means, and means upon said armature to engage said contact device while said controlling means is in engagement therewith.

2. In a time mechanism, a clock movement, an actuating spring therefor provided with a winding ratchet, a winding magnet, an armature for said magnet provided with a feed pawl engaging said ratchet, a magnet contact, a coöperating spring contact, a segmental wiper controlled by said actuating spring for forcing said contact into engagement, and means controlled by said ratchet for moving said wiper out of engagement with said spring contact.

3. In a time mechanism, a clock movement, an actuating spring therefor, a winding ratchet connected to said spring, a winding magnet, an armature for the magnet provided with a feed pawl engaging said ratchet, means actuated by said spring for controlling the intermittent application of current to said magnet, a contact device disposed in circuit with said magnet and in the path of travel of said means and means upon said armature to engage said contact device while said controlling means is in engagement therewith.

4. In a time mechanism, a clock movement, a spring wheel connected to actuate said movement, ratchet teeth carried by said wheel, a winding magnet, an armature pivotally mounted to coöperate therewith and having an angularly disposed lever arm, a feed pawl pivoted upon said arm to engage said ratchet, a contact carried by said wheel for controlling current to said magnet, and means actuated by said wheel to engage said contact.

5. In a time mechanism, a clock movement, a spring wheel connected to actuate said movement, ratchet teeth carried by said wheel, a winding magnet, an armature pivotally mounted to coöperate therewith and having a lever arm, a feed pawl carried by said arm to engage said ratchet, a spring for retaining said pawl in contact with said ratchet, and a spring contact for controlling current to said magnet disposed in the path of travel of said lever arm when in closed circuit position.

6. In a time mechanism, a clock movement, a spring wheel connected to actuate said movement, ratchet teeth carried by said wheel, a winding magnet, an armature pivotally mounted to coöperate therewith and having a lever arm, a feed pawl carried by said arm to engage said ratchet, a spring contact for controlling current to said magnet disposed in the path of travel of said lever arm when in closed circuit position, a wiper loosely mounted upon the shaft of the third wheel to engage said contact, and a pin carried by the shaft of said third wheel to engage and shift said wiper.

7. In a time mechanism, a clock movement, a spring wheel connected to actuate said movement, ratchet teeth carried by said wheel, a winding magnet, an armature pivotally mounted to coöperate therewith and having a lever arm, a feed pawl carried by said arm to engage said ratchet, a spring contact for controlling current to said magnet disposed in the path of travel of said lever arm when in closed circuit position, a wiper loosely mounted upon the shaft of the third wheel to engage said contact, a pin carried by the shaft of said third wheel to engage and shift said wiper, a pin carried by said spring wheel to engage said wiper, and a spring held pawl engaging said ratchet teeth to prevent reverse movement of the wheel.

8. In a time mechanism, a clock movement, a driving shaft geared thereto, a ratchet wheel, a winding magnet, an armature pivoted to coöperate therewith, a feed pawl carried by said armature to engage said wheel, a main spring connected to said wheel and shaft, a wiper loosely mounted on said shaft, a pin carried by said shaft to engage said wiper, a contact adapted to engage said wiper, and a magnet controlled feed device for said ratchet wheel in circuit with said contact and having means to intermittently engage said contact while the wiper is in engagement therewith.

9. In a time mechanism, a clock movement, a driving shaft geared thereto, a spring barrel carried by said shaft, a ratchet wheel disposed upon the periphery of said barrel, an insulated wiper loosely mounted on said shaft, a disk carried by said shaft and having a projection to engage said wiper, a contact disposed in the path of travel of said wiper, a pin carried by said barrel to engage said wiper, an oscillating lever arm having a pawl to engage said ratchet wheel, and a magnet disposed to actuate said arm when said wiper engages said contact.

10. In a time mechanism, a clock movement, a driving shaft geared thereto, a ratchet wheel, a main spring connected to said wheel and shaft, an insulated segmental wiper pivotally mounted on said shaft, a disk carried by said shaft and provided with a lateral pin to engage said wiper, a lateral pin carried by said wheel to engage said wiper, a spring contact disposed in the path of said wiper, and a magnet controlled feed device for said ratchet wheel in circuit with said contact.

11. In a time mechanism, a supporting frame provided with posts, a clock movement mounted on said posts, an electric lamp carried by said frame to illuminate the dial of said movement, a binding block carried by said frame, conductors extending from said block to said lamp, a source of electrical energy provided with circuit connections to control said lamp, a winding magnet upon the clock movement, a contact in circuit with said magnet, a coöperating spring contact in circuit with said block, and means carried by said movement to automatically control said spring contact.

In testimony whereof I affix my signature in presence of two witnesses.

ROBERT L. HIGHT.

Witnesses:
F. H. PITTMAN,
B. E. CONVERSE.